United States Patent [19]
Pegg et al.

[11] 3,783,897
[45] Jan. 8, 1974

[54] WARM LIQUID SUPPLY SYSTEM FOR RESERVOIR AND MIXING VALVE THEREFOR

[75] Inventors: Claude L. Pegg, 149 Grant St., Wabash, Ind. 46992; John L. Pegg, both of Wabash, Ind.

[73] Assignee: Claude L. Pegg, by said John L. Pegg

[22] Filed: Aug. 11, 1971

[21] Appl. No.: 170,820

[52] U.S. Cl.................. 137/564, 137/337, 137/434, 137/606, 4/18
[51] Int. Cl........................... A47k 17/00, E03d 3/00
[58] Field of Search..................... 137/564, 337, 434, 137/606, 625.46, 625.4; 251/309, 313, 312; 4/18

[56] References Cited
UNITED STATES PATENTS

| | | | |
|---|---|---|---|
| 2,659,898 | 11/1953 | Toye | 4/18 |
| 3,260,497 | 7/1966 | Blackford | 251/312 X |
| 3,624,842 | 12/1971 | Harrison | 4/18 |
| 2,669,391 | 2/1954 | Kelsch | 4/18 X |
| 2,900,645 | 8/1959 | Rom | 137/337 X |
| 3,038,695 | 6/1962 | Wildern | 251/309 X |
| 3,511,279 | 5/1970 | Hancock | 137/606 X |
| 2,716,424 | 8/1955 | Watts | 137/337 X |
| 2,830,612 | 4/1958 | Taylor | 137/337 |
| 3,025,876 | 3/1962 | Wolfe | 137/564.5 |

Primary Examiner—Samuel Scott
Assistant Examiner—Ira Lazarus
Attorney—Gust, Irish, Lundy & Welch

[57] ABSTRACT

A system for supplying warm liquid to a reservoir, such as a toilet tank. A mixing chamber is provided and a first conduit couples the mixing chamber to the reservoir for supplying warm liquid thereto, the first conduit having a valve therein for opening and closing the same. Second and third conduits are respectively coupled to the mixing chamber for respectively supplying hot and cold liquid thereto, a source of a cold liquid under pressure being coupled to the second conduit and heating means coupling the source to the third conduit for continuously heating the liquid supplied to the mixing chamber. The heating means is positioned at a lower level than the mixing chamber whereby liquid recirculates from the third conduit to the second conduit through the mixing chamber when the valve is closed thereby continuously providing warm liquid in the mixing chamber. Each of the second and third conduits has a restriction therein whereby the pressure in the mixing chamber is lower than in the second and third conduits upstream from the restrictions thereby causing mixing of the hot and cold liquid in the mixing chamber when the valve is open, the restrictions also limiting the recirculation thereby preventing material heating of the liquid in the second conduit. Each of the restrictions has a valve therein selectively actuable between open and closed positions.

11 Claims, 4 Drawing Figures

PATENTED JAN 8 1974 3,783,897
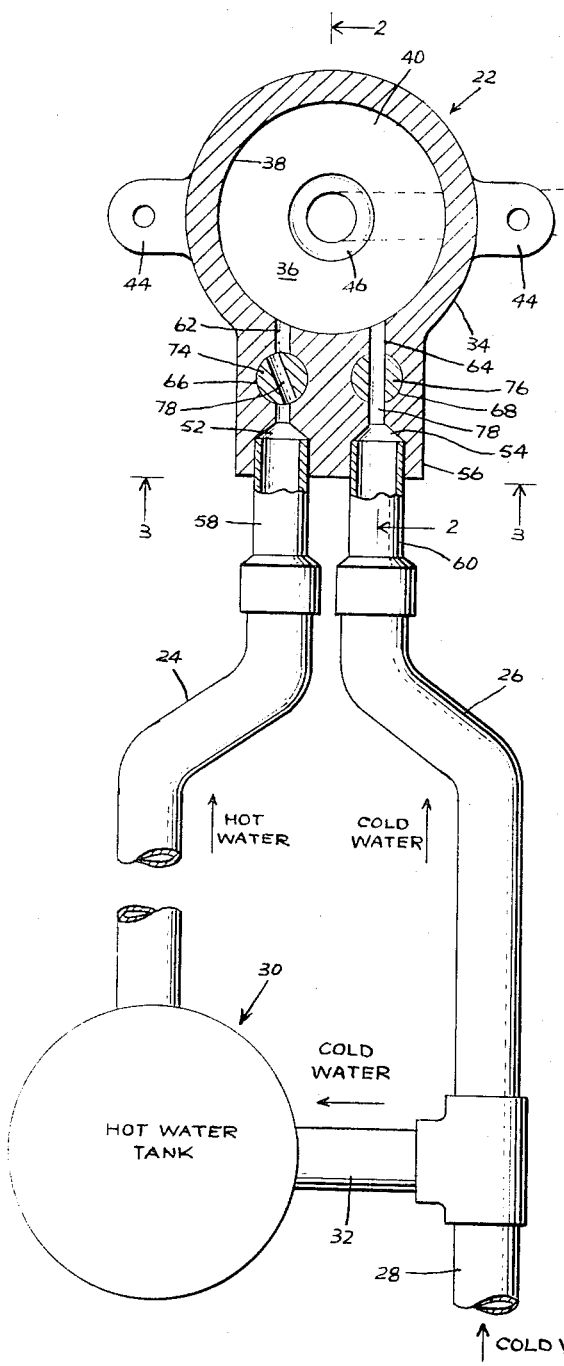
FIG.1
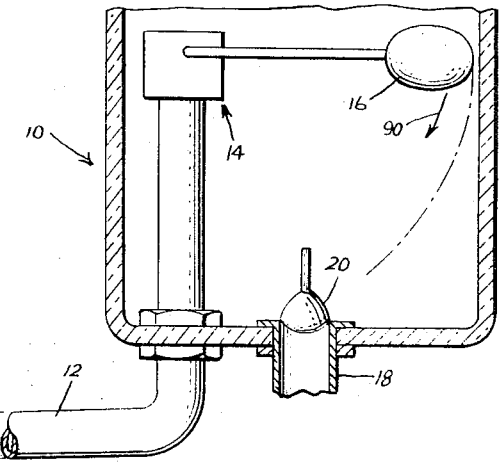
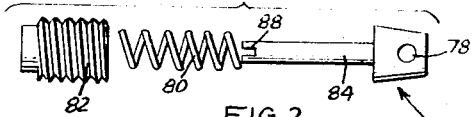
FIG.2
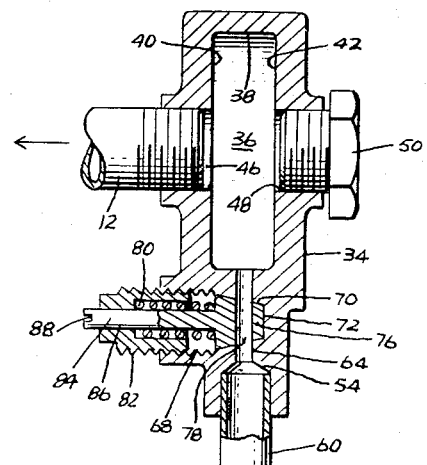
FIG.3
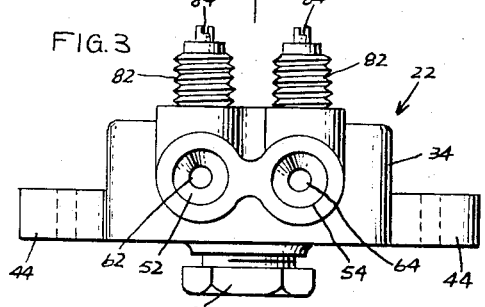
INVENTORS:
CLAUDE L. PEGG,
JOHN L. PEGG,
ATTORNEYS.

WARM LIQUID SUPPLY SYSTEM FOR RESERVOIR AND MIXING VALVE THEREFOR

BACKGROUND OF THE INVENTION

1. Field of the Invention

This invention relates generally to a system for supplying warm liquid to a reservoir, such as a toilet tank, and to a mixing valve therefor.

2. Description of the Prior Art

Toilet tanks are typically supplied with cold water and thus, during hot and humid weather, condensation or "sweating" commonly occurs on the exterior surface of the tank. It has been proposed to supply warm water to toilet tanks in order to inhibit such sweating. In one prior system, hot and cold waterlines were coupled to the float-actuated valve, each of the lines having a check valve therein which permitted flow of water in the hot and cold water lines only when the float-actuated valve was opened, the check valves normally preventing recirculation of water from one line to the other when the float-actuated valve was closed. However, if the toilet had not been flushed for some period of time, the water in the hot water line for some distance upstream from the check valve would become cold and thus, initial flushing of the tank following an extended period of non-use would not result in admission of sufficient hot water into the tank to inhibit sweating.

It is therefore desirable to provide a system in which a sufficient amount of recirculation is provided between the hot and cold water lines to insure that warm water is continuously available for admission to the tank, and in which the hot and cold water is premixed when the float-actuated valve is open thereby to admit water to the tank having the desired temperature.

SUMMARY OF THE INVENTION

A system for supplying warm liquid to a reservoir. A mixing chamber is provided and a first conduit couples the mixing chamber to the reservoir for supplying warm liquid thereto, the first conduit having valve means therein for opening and closing the first conduit thereby respectively to initiate and terminate liquid flow therein. Second and third conduits are respectively coupled to the mixing chamber for respectively supplying hot and cold liquid thereto. A source of cold liquid under pressure is coupled to the second conduit and heating means is coupled between the source and the third conduit for continuously heating the liquid supplied to the mixing chamber by the third conduit. The heating means is positioned at a lower level than the mixing chamber whereby liquid recirculates from the third conduit to the second conduit through the mixing chamber when the valve is closed thereby continuously providing warm liquid in the mixing chamber. Each of the second and third conduits has a restriction therein whereby the pressure in the mixing chamber is lower than in the second and third conduits upstream from the restrictions thereby causing mixing of the hot and cold liquid in the mixing chamber when the valve is opened, the restrictions also limiting the recirculation thereby to prevent material heating of the liquid in the second conduit. In the preferred embodiment, each of the restrictions has a valve therein selectively actuable between opened and closed positions.

It is accordingly an object of the invention to provide an improved system for supplying warm liquid to a reservoir.

Another object of the invention is to provide an improved system for supplying warm water to a toilet tank.

A further object of the invention is to provide an improved mixing valve.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a view schematically showing the system of the invention and showing a side cross-sectional view of the improved mixing valve of the invention;

FIG. 2 is a cross-sectional view taken generally along the line 2—2 of FIG 1;

FIG. 3 is a bottom view of the improved mixing valve of the invention as viewed generally along the line 3—3 of FIG. 1; and FIG. 4 is an exploded view of one of the valve assemblies of the mixing valve.

DESCRIPTION OF THE PREFERRED EMBODIMENT

Referring now to FIG. 1, a conventional toilet tank 10 is shown having a water supply conduit 12 extending therein. Conventional float-actuated valve 14 operated by float 16 is coupled in conduit 12 for opening and closing the same thereby to supply water to tank 10 when the water level therein falls below a predetermined level and to terminate the flow of water to the tank when the water level rises above a predetermined level. Discharge conduit 18 normally closed by conventional plunger 20 couples tank 10 to the toilet (not shown).

Water supply conduit 12 is coupled to mixing valve 22 of the invention, which has hot and cold water supply lines or conduits 24, 26 coupled thereto. Cold water line 26 is coupled to source 28 of cold water under pressure and conventional hot water heating tank 30 is supplied with cold water from source 28 by inlet line 32 and continuously supplies hot water to hot water line 24.

Referring now additionally to FIGS. 2 through 4, mixing valve 22 comprises body 34 preferably cast in one piece from suitable metal, such as bronze. Body 34 has mixing chamber 36 formed therein having cylindrical side wall 38 and spaced, opposite end walls 40, 42. A pair of mounting ears 44 may be integrally cast on body 34 for suitably mounting mixing valve 22. Outlet port 46 is formed in side wall 40 communicating with chamber 36 adjacent its center and conduit 12 is suitably secured in outlet port 46, as by a threaded connection. Another port 48 is provided in side wall 42 opposite outlet port 46, port 48 being closed by threaded plug 50. It will be readily understood that port 48 may be the discharge port with conduit 12 being coupled thereto, and port 46 closed by plug 50.

Inlet ports 52, 54 are formed in extension portion 56 integrally formed on body 34 and have hot and cold water lines 24, 26 coupled thereto, as by suitable fittings 58, 60. Reduced-diameter passages 62, 64 respectively extend between side wall 38 of mixing chamber 36 and inlet ports 52, 54.

A pair of openings 66, 68 are formed in extension portion 56 of body 34 and respectively intersect passages 62, 64, openings 66, 68 having tapered inner portions 70 terminating at inner ends 72 (FIG. 2). Valve members 74, 76 are respectively rotatably seated in tapered inner portion 70 of openings 66, 68 and abut inner ends 72. Each of the valve members 74, 76 has a transverse opening 78 formed therein, valve members 74, 76 being selectively rotatable between an opened position with opening 78 in alignment and in registry with the respective passges 62, 64 (as shown in the case of the cold water valve member 74 in FIG. 1), through a partially opened position (as shown in the case of hot water valve 74 in FIG. 1) to a fully closed position with the respective valve members 74, 76 blocking the respective passages 62, 64. Openings 78 in valve members 74, 76 have the same diameter as passages 62, 64, as shown.

Valve members 74, 76 are retained in openings 68, 70 by compression springs 80 and plug members 82 threadedly engaged in openings 68. Each of the valve members 74, 76 has an adjusting stem 84 which extends through the respective spring 80 and opening 86 in the respective plug 82, screwdriver slot 88 permitting adjustment of the respective valve member 74, 76 between its opened and closed positions.

Assuming now that float-actuated valve 14 is closed, that cold water valve 76 is fully opened, as shown, and that hot water valve 74 is partially opened, also as shown. With hot water heating tank 30 located at a level lower than mixing valve 22, the hot water in line 24 will levitate upwardly, passing slowly through valve 74 and the reduced-diameter passage or restriction 62 into mixing chamber 36, displacing cold water from mixing chamber 36 into passage 64 and through valve 76 into line 26. Thus, recirculation of warm water from hot water line 24 through mixing chamber 36 to cold water line 26 occurs thereby insuring that the water in mixing chamber 36 is always warm however, by reason of the reduced-diameter passages or restrictions 62, 64, the recirculation of warm water is not sufficient to materially affect the temperature of the water in cold water line 26.

Assuming now that float-actuated valve 14 is opened in response to downward movement of float 16, as shown by arrow 90, due to flushing of the toilet, warm water will flow from mixing chamber 36 through conduit 12 into tank 10, thus reducing the pressure in mixing chamber 36. By reason of the provision of the reduced-diameter passages or restrictions 62, 64, the pressure in mixing chamber 36 when float-actuated valve 14 is opened is lower than that in lines 24, 26, the resulting pressure differential ensuring that mixing of the hot and cold water respectively supplied by lines 24, 26 occurs in mixing chamber 36 so that premixed warm water is supplied to tank 10 through conducit 12.

It will be seen that valves 74, 76 permit selective control of the temperature of the water supplied to tank 10, and also permit complete shut-off of both the hot and cold water when maintenance on some part of the toilet is required. It will further be seen that valves 74, 76 are self-cleaning by reason of their rotary action.

While there have been described above the principles of this invention in connection with specific apparatus, it is to be clearly understood that this description is made only by way of example and not as a limitation to the scope of the invention.

What is claimed is:

1. A system for supplying warm liquid to a reservoir comprising: a body having an open mixing chamber, a first conduit coupled to said mixing chamber and adapted to supply warm liquid to said reservoir, valve means for opening and closing said first conduit thereby respectively to initiate and terminate liquid flow therein, second and third conduits coupled to said mixing chamber for respectively supplying hot and cold liquid thereto, a source of cold liquid under pressure coupled to said second conduit, a source of heated liquid under pressure coupled to said third conduit for supplying heated liquid to said mixing chamber, said source of heated liquid being positioned at a lower level than said mixing chamber whereby liquid recirculates from said third conduit to said second conduit through said mixing chamber when said valve means is closed thereby continuously providing warm liquid in said mixing chamber, each of said second and third conduits having a restriction therein of such size whereby the pressure in said mixing chamber is lower than in said second and third conduits upstream from said restrictions when said valve means is open thereby causing mixing of said heated and cold liquid in said mixing chamber, said restrictions also limiting said recirculation thereby preventing material heating of the liquid in said second conduit, said restrictions being in said body, each of said restrictions having a valve therein selectively actuable to control flow of liquid between open and closed positions, said body having an outlet port communicating with said mixing chamber and said first conduit being connected thereto, a pair of inlet ports in said body respectively having said second and third conduits connected thereto and forming extensions thereof, said restrictions comprising reduced-diameter passages in said body respectively coupling said inlet ports to said mixing chamber, said outlet port being offset from the direct path of the streams issuing from said pair of inlet ports.

2. The system of claim 1 further comprising a valve in each of said passages and selectively actuable to control flow of liquid between open and closed positions.

3. The system of claim 2 wherein said body has a pair of openings formed therein respectively intersecting said passages, each of said valves comprising a valve member rotatably seated in the respective opening and extending across the respective passage, each of said members having an opening extending transversely therethrough which is aligned with the respective passage in one rotational position of the member thereby providing said open valve position, each of said members blocking the respective passage in another rotational position of the member thereby providing said closed valve position.

4. The system of claim 3 wherein each of said members is retained in the respective opening by a compression spring and a plug threadedly engaged in the opening, each of said members having an adjusting stem thereon for selectively rotating the member and which extends through the respective spring and an opening in the respective plug.

5. The system of claim 4 wherein said body is formed in one piece.

6. The system of claim 3 wherein said chamber is defined by a generally cylindrical side wall and spaced, opposite, generally flat end walls, said passages communicating with said chamber through said side wall, said outlet port communicating with said chamber through one of said end walls generally adjacent the center thereof.

7. The system of claim 1 including a toilet tank as the reservoir and said valve means is disposed in said tank and actuated in response to the level of liquid therein.

8. A mixing valve assembly comprising a body having a mixing chamber therein, said body having an outlet port and two inlet ports communicating with said chamber, said body having two passages respectively connecting said inlet ports to said chamber, valve means in each of said passages selectively actuable between open and closed positions to control flow therethrough, said passages being of smaller cross-sectional size than said inlet ports, respectively, said outlet port being offset from the axes of the streams issuing from both of said passages into said chamber, said chamber having a wall portion opposite the openings of said passages toward which streams issuing from said passages are directed, said outlet port being in another wall portion of said chamber.

9. The assembly of claim 8 wherein said body is formed in one piece.

10. The assembly of claim 8 wherein said chamber is defined by a generally cylindrical side wall and spaced, opposite, generally flat end walls, said passages communicating with said chamber through said side wall, said outet port communicating with said chamber through one of said end walls generally adjacent to the center thereof.

11. The assembly of claim 8 wherein said body has a pair of openings formed therein respectively intersecting said passages, each of said valve means comprising a valve member rotatably seated in the respective opening and extending across the respective passage, each of said members having an opening extending transversely therethrough aligned with the respective passage in one rotational position of the member thereby providing said open valve position, each of said members blocking the respective passage in another rotational position of the member thereby providing said closed valve position, each of said members being retained in the respective opening by a compression spring and a plug threadedly engaged in the opening, each of said members having an axially extending adjusting stem thereon for selectively rotating the member and which extends through the spring and an opening in the plug, the portion of the valve member and the opening in which it is seated being of complementary frusto-conical shape with the smaller diameter end thereof being opposite the distal end of said stem whereby adjusting force applied to said distal end axially toward said portion results in more forceful seating of the latter.

* * * * *